(12) United States Patent
Kumagai et al.

(10) Patent No.: US 11,655,931 B2
(45) Date of Patent: May 23, 2023

(54) HEAT INSULATING MATERIAL AND MANUFACTURING METHOD THEREOF

(71) Applicant: Sumitomo Riko Company Limited, Aichi (JP)

(72) Inventors: Shinji Kumagai, Aichi (JP); Naoki Katayama, Aichi (JP); Shota Hayashi, Aichi (JP); Yutaro Taguchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/371,132

(22) Filed: Jul. 9, 2021

(65) Prior Publication Data

US 2021/0332932 A1 Oct. 28, 2021

Related U.S. Application Data

(63) Continuation of application No. PCT/JP2021/003010, filed on Jan. 28, 2021.

(30) Foreign Application Priority Data

Mar. 12, 2020 (JP) .............................. JP2020-043417

(51) Int. Cl.
*F16L 59/02* (2006.01)
*B32B 5/26* (2006.01)
(Continued)

(52) U.S. Cl.
CPC .............. *F16L 59/029* (2013.01); *B32B 5/18* (2013.01); *B32B 5/26* (2013.01); *B32B 5/30* (2013.01);
(Continued)

(58) Field of Classification Search
CPC . B32B 17/02; B32B 2250/02; B32B 2250/40; B32B 2255/02; B32B 2255/20;
(Continued)

(56) References Cited

U.S. PATENT DOCUMENTS 3,353,975 A * 11/1967 Shannon .................. C04B 28/24
106/676
3,779,860 A * 12/1973 Oshida .................... C04B 26/26
162/123

(Continued)

FOREIGN PATENT DOCUMENTS

| CA | 2231428 | 3/1997 |
| CN | 107267010 | 10/2017 |

(Continued)

OTHER PUBLICATIONS

Zhang Zhihua et al., "Preparation and Properties of SiO2 Aerogel Materials" with English translation thereof, Journal of Aeronautical Materials, vol. 35, Feb. 2015, pp. 1-20.

(Continued)

*Primary Examiner* — Hai Vo
(74) *Attorney, Agent, or Firm* — JCIPRNET

(57) ABSTRACT

A heat insulating material (1) includes a heat insulating layer (10) which has a porous structural body, a reinforcing fiber, and nanoparticles of a metal oxide used as a binder, wherein the porous structural body has a skeleton formed by connecting a plurality of particles, has pores inside, and has a hydrophobic portion on at least one surface between a surface and an inside of the porous structural body. The heat insulating layer (10) has a mass loss rate of 10% or less in thermogravimetric analysis held at 500° C. for 30 minutes.

12 Claims, 2 Drawing Sheets

(51) Int. Cl.
    *B32B 17/02*     (2006.01)
    *B32B 5/18*     (2006.01)
    *B32B 5/30*     (2006.01)

(52) U.S. Cl.
    CPC .......... *B32B 17/02* (2013.01); *B32B 2250/40* (2013.01); *B32B 2255/02* (2013.01); *B32B 2255/20* (2013.01); *B32B 2262/101* (2013.01); *B32B 2264/1021* (2020.08); *B32B 2266/057* (2016.11); *B32B 2266/126* (2016.11); *B32B 2307/304* (2013.01)

(58) Field of Classification Search
    CPC ........ B32B 2262/101; B32B 2262/103; B32B 2266/126; B32B 2307/304; B32B 2307/306; B32B 2307/718; B32B 2419/00; B32B 2439/00; B32B 2457/04; B32B 2571/00; B32B 2605/003; B32B 5/022; B32B 5/26; B32B 7/05; B32B 7/08; F16L 59/029; F16L 59/06; C04B 38/00
See application file for complete search history.

(56) References Cited

U.S. PATENT DOCUMENTS

| | | | |
|---|---|---|---|
| 4,038,447 A * | 7/1977 | Brock | ................ B32B 3/04 |
| | | | 428/921 |
| 5,948,314 A | 9/1999 | Geiss et al. | |
| 2013/0091682 A1 | 4/2013 | Zhang et al. | |
| 2013/0344279 A1 | 12/2013 | Doshi et al. | |
| 2014/0057083 A1 | 2/2014 | Imae et al. | |
| 2017/0101773 A1 | 4/2017 | Doshi et al. | |
| 2017/0204248 A1 | 7/2017 | Ochiai | |
| 2018/0002508 A1* | 1/2018 | Hattori | ................ C08J 7/054 |
| 2022/0181716 A1* | 6/2022 | Katayama | ......... H01M 10/6555 |

FOREIGN PATENT DOCUMENTS

| | | |
|---|---|---|
| CN | 107556862 | 1/2018 |
| CN | 108129628 | 6/2018 |
| JP | H0551486 | 3/1993 |
| JP | H10508049 | 8/1998 |
| JP | H11513349 | 11/1999 |
| JP | 2001262067 | 9/2001 |
| JP | 2002267092 | 9/2002 |
| JP | 2004010423 | 1/2004 |
| JP | 2007230858 | 9/2007 |
| JP | 2012145204 | 8/2012 |
| JP | 2013534958 | 9/2013 |
| JP | 2014035043 | 2/2014 |
| JP | 2017155402 | 9/2017 |
| JP | 2019065264 | 4/2019 |
| JP | 6644962 | 2/2020 |
| KR | 20150005753 | 1/2015 |
| WO | 2013141189 | 9/2013 |
| WO | 2015002488 | 1/2015 |
| WO | 2015182349 | 12/2015 |
| WO | 2017170498 | 10/2017 |

OTHER PUBLICATIONS

"Office Action of China Counterpart Application" with English translation thereof, dated May 31, 2022, p. 1-p. 19.
"International Search Report (Form PCT/ISA/210) of PCT/JP2021/003010," dated Mar. 9, 2021, with English translation thereof, pp. 1-7.
"Written Opinion of the International Searching Authority (Form PCT/ISA/237)" of PCT/JP2021/003010, dated Mar. 9, 2021, with English translation thereof, pp. 1-10.
Office Action of China Counterpart Application, with English translation thereof, dated Dec. 5, 2022, pp. 1-17.
"International Search Report (Form PCT/ISA/210) of PCT/JP2021/007966," dated May 18, 2021, with English translation thereof, pp. 1-5.
"Written Opinion of the International Searching Authority (Form PCT/ISA/237) of PCT/JP2021/007966," dated May 18, 2021, with English translation thereof, pp. 1-8.

* cited by examiner

HEAT INSULATING MATERIAL AND MANUFACTURING METHOD THEREOF

CROSS-REFERENCE TO RELATED APPLICATIONS

This application is a continuation application of International Application number PCT/JP2021/003010, filed on Jan. 28, 2021, which claims the priority benefit of Japan Patent Application No. 2020-043417 filed on Mar. 12, 2020. The entirety of each of the above-mentioned patent applications are hereby incorporated by reference herein and made a part of this specification.

BACKGROUND

Technical Field

The present disclosure relates to a heat insulating material using a porous structural body such as a silica aerogel or the like, and relates to a manufacturing method of the heat insulating material.

Related Art

The silica aerogel is a porous material having a pore structure in which silica fine particles are connected to form a skeleton, the pore structure having a size of about 10 to 50 nm. A thermal conductivity of the silica aerogel is less than that of air. Therefore, the development of a heat insulating material utilizing the high heat insulating property of the silica aerogel is in progress. For example, Patent literature 1 describes an article containing the silica aerogel bonded by water-dispersible polyurethane and having a thermal conductivity of 0.025 W/m·K or less. As in the article, a binder such as a urethane resin or the like is used to fix the silica aerogel.

However, if a conventional heat insulating material using a urethane binder is used in a high temperature atmosphere of about 500° C., there is a possibility that the urethane binder which is an organic component may be decomposed and deteriorated, which causing gas or cracks, and thereby a shape of the urethane binder cannot be maintained. In addition, since the urethane binder is relatively soft, there is a problem that the heat insulating material will be crushed if the heat insulating material is compressed, and the heat insulating structure is difficult to maintain.

On the other hand, for example, Patent literatures 2 to 5 propose composite materials using an inorganic compound such as a silicate or the like as the binder. That is, Patent literature 2 describes a composite material having the silica aerogel, an organic binder or an inorganic binder, and a glass fiber, and describes a water glass (sodium silicate) as the inorganic binder. Patent literature 3 describes a heat insulating material obtained by solidifying an aerogel with a water-soluble binder and an inorganic binder such as powdered sodium silicate or the like. Patent literature 4 describes a flexible insulating structure body in which a layer having an aerogel and an inorganic binder such as the sodium silicate or the like are formed on a non-woven fabric (batting). Patent literature 5 describes a heat insulating material composition having the silica aerogel, a ceramic raw material liquid capable of forming crystals by a hydrothermal reaction, a surfactant, and a reinforcing fiber.

LITERATURE OF RELATED ART

Patent Literature

Patent literature 1: National Publication of International Patent Application No. 2013-534958
Patent literature 2: National Publication of International Patent Application No. 11-513349
Patent literature 3: Japanese Patent Laid-Open No. 2004-10423
Patent literature 4: Japanese Patent Laid-Open No. 2017-155402
Patent literature 5: International Publication No. 2013/141189

Depending on an application of the heat insulating material, the heat insulating material may be required both to maintain the shape even when used in a high temperature atmosphere (heat resistance), and to be resistant to crushing and cracking and be capable of maintaining the heat insulating property even if the heat insulating material is compressed (compression resistance). However, when the inorganic compound is used as the binder, problems caused by the decomposition and deterioration of the binder are solved, but a molded body becomes hard and brittle. Since Patent literatures 2 to 4 merely describe the use of the inorganic binder, it is difficult to improve the heat resistance and the compression resistance by this alone. In Patent literature 5, a ceramic raw material liquid capable of forming crystals by the hydrothermal reaction is used, and by dehydrating, heating, and pressurizing the heat insulating material composition containing the ceramic raw material liquid, the synthesis of ceramic crystals is promoted on surfaces of the silica aerogel and the reinforcing fiber. The formed ceramic crystal serves as the binder that bonds the silica aerogels to each other. According to the manufacturing method described in Patent literature 5, steps of preparing the heat insulating material composition, injecting into the mold and dehydrating, and heating and pressurizing the obtained primary molded body are required. Thus, the manufacturing method requires a lot of man-hours and is complicated and costly. Additionally, a thin film is difficult to make, because a mold is used for molding. In addition, the formed ceramic crystal is a bulk crystal having a needle-like shape, a fibrous shape, or the like, and having a particle diameter of about 1 to 50 μm (paragraphs [0028] and [0057] in Patent literature 5). Therefore, the obtained heat insulating material does not satisfy the desired heat resistance and compression resistance.

The present disclosure is completed in view of such circumstances, and a problem of the present disclosure is to provide a heat insulating material which has a heat insulating layer having excellent heat resistance and compression resistance as well as a heat insulating property. In addition, a problem of the present disclosure is to provide a method capable of relatively easily manufacturing this heat insulating material.

SUMMARY (1) A heat insulating material of the present disclosure includes a heat insulating layer which has a porous structural body, a reinforcing fiber, and nanoparticles of a metal oxide used as a binder, wherein the porous structural body has a skeleton formed by connecting a plurality of particles, has pores inside, and has a hydrophobic portion on at least one surface between a surface and an inside of the porous structural body. This heat insulating layer has a mass loss rate of 10% or less in thermogravimetric analysis held at 500° C. for 30 minutes.

(2) A manufacturing method of a heat insulating material of the present disclosure is a manufacturing method of a heat insulating material having, in addition to the configuration of the above (1), a first base material arranged on one side of the heat insulating layer in a thickness direction. The manufacturing method includes: a paint preparation step of preparing a paint for heat insulating layer which has the porous structural body, the reinforcing fiber, and a dispersion liquid in which the nanoparticles of the metal oxide are dispersed in a liquid; and an applying step of applying this paint for heat insulating layer to the first base material.

Figure 1:
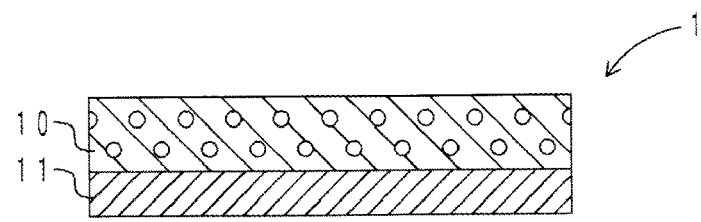
FIG. 1 is a schematic cross-sectional view of a heat insulating material of a first embodiment.

DESCRIPTION OF THE EMBODIMENTS (1) The heat insulating layer in the heat insulating material of the present disclosure (hereinafter, may be simply referred to as "the heat insulating layer of the present disclosure") has the porous structural body having the skeleton formed by connecting the plurality of particles, having the pores inside, and having the hydrophobic portion on at least one surface between a surface and an inside of the porous structural body. A size of pores formed between the skeletons of the porous structural body is about 10 to 50 nm, and most of the pores are so-called mesopores of 50 nm or less. Since the mesopore is smaller than the mean free path of air, heat transfer is hindered. Thereby, the heat insulating layer of the present disclosure exhibits an excellent heat insulating effect.

The heat insulating layer of the present disclosure has the nanoparticles of the metal oxide as the binder for bonding constituents. Since no organic material is used as the binder, gas and cracks are not generated due to the decomposition and deterioration of the binder even when the heat insulating layer of the present disclosure is used in a high temperature atmosphere. Thus, the heat insulating layer of the present disclosure can maintain the shape even at a high temperature, and the mass of the heat insulating layer is less likely to decrease. That is, according to the heat insulating layer of the present disclosure, the heat insulating layer is held at 500° C. for 30 minutes, and the mass loss rate calculated from the mass before and after the holding is 10% or less.

When the nanoparticles of the metal oxide are used as the binder, the heat insulating layer can be made harder as compared with the case where an organic material such as a urethane resin or the like is used. Therefore, the heat insulating layer is less likely to be crushed and the heat insulating structure can be maintained even when the heat insulating layer is compressed. In addition, by using the nanoparticles (particles on the order of nanometers) instead of the bulk crystal described in the above Patent literature 5 as the binder, the drawbacks of hardness and brittleness caused by having an inorganic compound are improved.

Additionally, the heat insulating layer of the present disclosure has the reinforcing fiber. Due to the action of both the nanoparticles of the metal oxide and the reinforcing fiber, the shape retention at a high temperature (heat resistance) is improved, and the heat insulating layer is less likely to be crushed or cracked even when compressed (that is, the compression resistance is improved). Thereby, the heat insulating layer can maintain the heat insulating property even when compressed. In addition, since stability and film forming property of the paint for forming the heat insulating layer are improved due to having the reinforcing fiber, the strength and heat resistance of the heat insulating layer are improved. As described above, the heat insulating material of the present disclosure has excellent heat insulating property, heat resistance, and compression resistance.

(2) According to the manufacturing method of the heat insulating material of the present disclosure, the paint for heat insulating layer, which has the porous structural body, the reinforcing fiber, and the dispersion liquid in which the nanoparticles of the metal oxide are dispersed in a liquid, is applied to the first base material to manufacture the heat insulating layer. According to the manufacturing method of the heat insulating material of the present disclosure, there is no need to proceed with the hydrothermal reaction to synthesize the bulk crystal and there is no need to use the mold in the manufacturing process of the heat insulating layer as described in the above Patent literature 5. Thus, the heat insulating layer can be manufactured relatively easily, and since the method for applying the paint for heat insulating layer is adopted, the heat insulating layer can be easily thinned. In addition, the paint for heat insulating layer has excellent stability and film forming property because of having the reinforcing fiber. Thus, the heat insulating layer having excellent strength and heat resistance can be manufactured.

Hereinafter, embodiments of a heat insulating material of the present disclosure and the manufacturing method thereof are described. Moreover, the heat insulating material of the present disclosure and the manufacturing method thereof are not limited to the following embodiments, and can be carried out in various forms in which modifications, improvements, and the like that can be made by those skilled in the art are performed without departing from the gist of the present disclosure.

<Heat Insulating Material>

The heat insulating material of the present disclosure includes a heat insulating layer. First, a configuration of the heat insulating layer is described, and then the other configurations are described.

[Heat Insulating Layer]

The heat insulating layer has a porous structural body, a reinforcing fiber, and nanoparticles of a metal oxide used as a binder. The porous structural body has a skeleton formed by connecting a plurality of particles, has pores inside, and has a hydrophobic portion on at least one surface between a surface and an inside of the porous structural body. A structure, a size, and the like of the porous structural body are not particularly limited. For example, a diameter of the particles (primary particles) forming the skeleton is desirably about 2 to 5 nm, and a size of the pores formed between the skeletons is desirably about 10 to 50 nm.

When the maximum length of the porous structural body is taken as the particle diameter, an average particle diameter of the porous structural body is desirably about 1 to 200 μm. Since the larger the particle diameter of the porous structural body, the smaller the surface area and the larger the pore (void) volume, an effect of enhancing the heat insulating property is increased. For example, a porous structural body having an average particle diameter of 10 μm or more is suitable. On the other hand, in consideration of stability of a paint for forming the heat insulating layer and the ease of coating, a porous structural body having an average particle diameter of 100 μm or less is suitable. In addition, when two or more types having different particle diameters are used in combination, small-diameter porous structural bodies enter a gap between large-diameter porous structural bodies, and thus a filling amount can be increased, and the effect of enhancing the heat insulating property is increased.

A shape of the porous structural body is not particularly limited, but a chamfered shape, a spherical shape, or the like is desirable for reasons such as reducing voids between the porous structural bodies to enhance the heat insulating effect, improving shape retention of the heat insulating layer as described later, and the like. The porous structural body may be used as the porous structural body is manufactured, or may be further pulverized to be used. When the porous structural body is pulverized, a crushing device such as a jet mill or the like, a spheroidizing processing device, or the like may be used. By the pulverization processing, corners of the particles are removed, and the particles have a rounded shape. Thereby, the particles are easy to bond by the binder (the nanoparticle of the metal oxide), and the porous structural body is less likely to fall off (so-called powder falling is reduced). In addition, the surface of the heat insulating layer becomes dense, and the shape retention is improved.

The type of the porous structural body is not particularly limited. The primary particle may be, for example, silica, alumina, zirconia, titania, or the like. Especially, a porous structural body in which the primary particle is silica is desirable from the viewpoint of excellent chemical stability. For example, a silica aerogel in which a plurality of silica particles are connected to form a skeleton is mentioned. Moreover, due to the difference in a drying method when the aerogel is manufactured, the one dried at a normal pressure may be called "xerogel", and the one dried at a supercritical pressure may be called "aerogel". However, in the present specification, both are collectively referred to as "aerogel".

The porous structural body has the hydrophobic portion on at least one surface between a surface and an inside of the porous structural body. If the porous structural body has the hydrophobic portion on the surface, since permeation of water and the like can be suppressed, the pore structure is maintained and the heat insulating property is less likely to be impaired. For example, the silica aerogel having the hydrophobic portion at least on the surface can be manufactured by applying a hydrophobic treatment such as imparting a hydrophobic group and the like in the manufacturing process.

A content of the porous structural body may be appropriately determined in consideration of the thermal conductivity, hardness, compression resistance, and the like of the heat insulating layer. For example, the content of the porous structural body is desirably 25 parts by mass or more with respect to 100 parts by mass of components excluding the porous structural body and the reinforcing fiber from the viewpoint of reducing the thermal conductivity and achieving the desired compression resistance. The content of the porous structural body is more suitably 50 parts by mass or more. On the other hand, if there are too many porous structural bodies, the film forming property is lowered and the powder falling is likely to occur. Thus, the content of the porous structural body is desirably 280 parts by mass or less with respect to 100 parts by mass of the components excluding the porous structural body and the reinforcing fiber.

The reinforcing fibers are physically intertwined around the porous structural body to suppress the falling of the porous structural body and improve the film forming property and the heat resistance. A type of the reinforcing fiber is not particularly limited, but is desirably an inorganic fiber material from the viewpoint of suppressing decomposition and deterioration of organic components when the reinforcing fiber is used at a high temperature. For example, a glass fiber and a ceramic fiber such as an alumina fiber or the like are suitable.

The size of the reinforcing fiber may be appropriately determined in consideration of the heat insulating property and heat resistance of the heat insulating layer, the film forming property when the heat insulating layer is formed, and the like. For example, if the reinforcing fiber is too thin, the reinforcing fiber is easily aggregated, and thus viscosity of the paint for forming the heat insulating layer may be increased and the film forming property may be lowered. A suitable diameter of the reinforcing fiber is 6.5 μm or more. Conversely, if the reinforcing fiber is too thick, because the reinforcing effect is reduced, the film forming property and the heat resistance may be lowered, and because the heat transfer path is easily formed, the thermal conductivity may be increased and the heat insulating property may be lowered. A suitable diameter of the reinforcing fiber is 18 μm or less. In addition, if the reinforcing fiber is too short, the reinforcing effect is reduced, and thus the film forming property and the heat resistance may be lowered. A suitable length is 3 mm or more. Conversely, if the reinforcing fiber is too long, the reinforcing fiber is easily aggregated, and thus the viscosity of the paint for forming the heat insulating layer may be increased and the film forming property may be lowered. In addition, because the heat transfer path is easily formed, the thermal conductivity may be increased and the heat insulating property may be lowered. A suitable length of the reinforcing fiber is 25 mm or less.

A content of the reinforcing fiber may be appropriately determined in consideration of the film forming property, the heat resistance, and the like of the heat insulating layer. For example, the content of the reinforcing fiber is desirably 5 parts by mass or more with respect to 100 parts by mass of the components excluding the porous structural body and the reinforcing fiber from the viewpoint of ensuring the film forming property and achieving the desired heat resistance. On the other hand, if there are too many reinforcing fibers, the reinforcing fiber aggregates, and thus the viscosity of the paint for forming the heat insulating layer may be increased and the film forming property may be lowered. In addition, because the heat transfer path is easily formed, the thermal conductivity may be increased and the heat insulating property may be lowered. Thus, the content of the reinforcing fiber is desirably 200 parts by mass or less, and further desirably 130 parts by mass or less with respect to 100 parts by mass of the components excluding the porous structural body and the reinforcing fiber.

The nanoparticle of the metal oxide is a binder for bonding the constituents of the heat insulating layer such as the porous structural body, the reinforcing fiber, and the like. The type of the metal oxide is not particularly limited, and may be silica, titania, zinc oxide, zirconia, or the like. Especially, the silica is suitable for the reason that the silica is easily compatible with the porous structural body and the reinforcing fiber and is inexpensive and easily available. That is, the nanoparticle of the metal oxide is desirably the silica particle.

The heat insulating layer of the present disclosure has a mass loss rate of 10% or less in thermogravimetric analysis held at 500° C. for 30 minutes. In the thermogravimetric analysis (TGA), a sample of the heat insulating layer is held in an air atmosphere at 500° C. for 30 minutes to measure the mass before and after heating. The mass loss rate is calculated by the following formula (I).

$$\text{Mass loss rate}(\%) = (W_0 - W_1)/W_0 \times 100 \quad (I)$$

[$W_0$: Sample Mass Before Heating; $W_1$: Sample Mass after Heating]

The heat insulating layer of the present disclosure may contain other components in addition to the porous structural body, the reinforcing fiber, and the nanoparticle of the metal oxide. For example, when the paint for forming the heat insulating layer is prepared, a thickener, a dispersant, a surfactant, and the like added to improve the dispersibility of the porous structural body may be used.

[Configuration Other than Heat Insulating Layer]

The heat insulating material of the present disclosure may be only composed of the heat insulating layer, or may be configured by combining the heat insulating layer with other members. As a first embodiment in which the heat insulating layer is combined with other members, there is one in which the heat insulating layer and a first base material laminated on this heat insulating layer are included. FIG. 1 shows a schematic cross-sectional view of the heat insulating material of the first embodiment. As shown in FIG. 1, a heat insulating material 1 has a heat insulating layer 10 and a first base material 11. The heat insulating layer 10 has the silica aerogel, the glass fiber, and the silica particle. The silica particle is a nanoparticle having an average particle diameter of 12 nm. The silica aerogel and the glass fiber are bonded via the silica particle. A thickness of the heat insulating layer 10 is 2 mm. The first base material 11 is laminated on one side (the lower side) of the heat insulating layer 10 in the thickness direction. The first base material 11 is made of a glass cloth. A thickness of the first base material 11 is 0.1 mm. A lower surface of the heat insulating layer 10 is impregnated with a mesh near an upper surface of the first base material 11, and thereby the heat insulating layer 10 and the first base material 11 are adhered to each other.

In the heat insulating material of the first embodiment, the first base material is not particularly limited in a cloth, a non-woven fabric, a sheet material, and the like, but the one which has a relatively low thermal conductivity is desirable. In addition, the one which has a high shape retention and flame retardancy even at a high temperature is desirable. For example, a cloth and a non-woven fabric that are manufactured from an inorganic fiber such as a glass fiber, a metal fiber, or the like are mentioned. Especially, the glass cloth is suitable. The first base material may be configured by one layer, or may be a laminated body having two or more layers.

Figure 2:
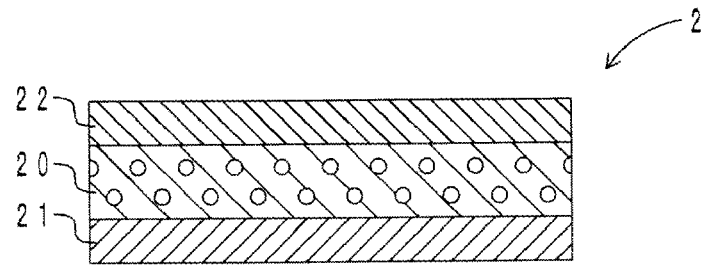
FIG. 2 is a schematic cross-sectional view of a heat insulating material of a second embodiment.

As a second embodiment in which the heat insulating layer is combined with other members, there is one in which the heat insulating layer, the first base material laminated on this heat insulating layer, and a second base material laminated on the opposite side of this first base material with the heat insulating layer sandwiched therebetween are included. As shown in FIG. 2, a heat insulating material 2 has a heat insulating layer 20, a first base material 21, and a second base material 22. The configurations of the heat insulating layer 20 and the first base material 21 are the same as those of the first embodiment. The second base material 22 is laminated on the opposite side (upper side) of the first base material 21 with the heat insulating layer 20 sandwiched therebetween. That is, the heat insulating layer 20 is interposed between the first base material 21 and the second base material 22. The second base material 22 is made of the glass cloth. A thickness of the second base material 22 is 0.1 mm. An upper surface of the heat insulating layer 20 is impregnated with a mesh near a lower surface of the second base material 22, and thereby, the heat insulating layer 20 and the second base material 22 are adhered to each other.

In the second embodiment, the first base material and the second base material do not necessarily have to be the same, but the second base material desirably has a relatively small thermal conductivity and has the shape retention and flame retardancy even at a high temperature. As the second base material, the cloth or the non-woven fabric manufactured from the inorganic fiber such as the glass cloth or the like is suitable as in the case of the first base material. The second base material may be configured by one layer, or may be a laminated body having two or more layers.

Furthermore, in the above second embodiment, the heat insulating material of the present disclosure can be configured to have a main body part in which the first base material and the second base material are laminated with the heat insulating layer sandwiched therebetween, and a peripheral edge part in which the first base material and the second base material overlap around the heat insulating layer. In this case, by fixing the first base material and the second base material at the peripheral edge part, the heat insulating layer can be accommodated in a bag-shaped space formed by the two base materials. The peripheral edge part to be fixed may be a part or the whole. If the whole of the peripheral edge part is fixed, the powder falling of the porous structural body is effectively suppressed. The fixing method is not particularly limited, and for example, the first base material and the second base material may be fused using a laser or the like. Alternatively, a fixing member such as an adhesive, a clip member, a caulking member, a plate spring member, or the like may be used. In addition, a member made of an elastomer such as a thermoplastic elastomer, a rubber, or the like, a resin, and a metal may be fixed with an adhesive to form a fixing member. The adhesive may be an organic adhesive using the elastomer or the resin. For example, if the adhesive has elasticity, when the heat insulating material is compressed in the lamination direction, the load can be absorbed. In this case, if the thickness of the adhesive is set to be equal to or more than the thickness of the heat insulating layer, the cracking of the heat insulating layer is effectively suppressed. In addition, from the viewpoint of increasing the flame retardancy, an organic adhesive having flame retardancy such as a fluorine rubber or the like, or an inorganic adhesive is desirably used.

Figure 3:
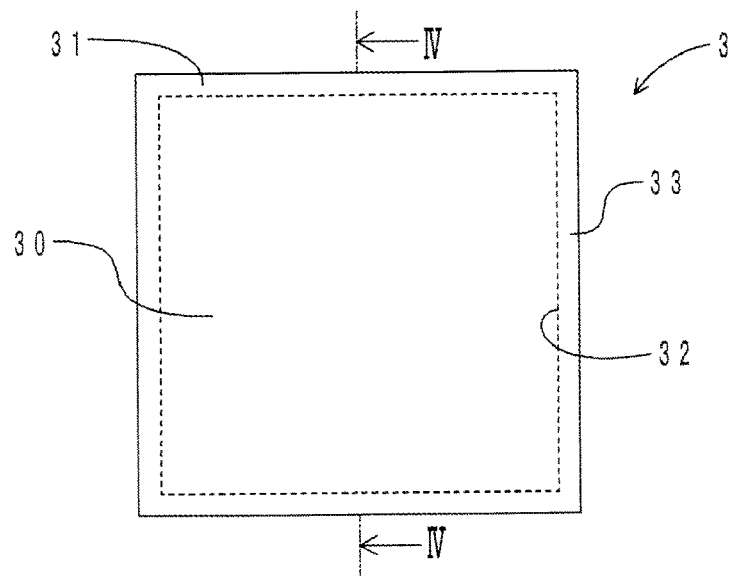
FIG. 3 is a front view of a heat insulating material of a third embodiment.
Figure 4:
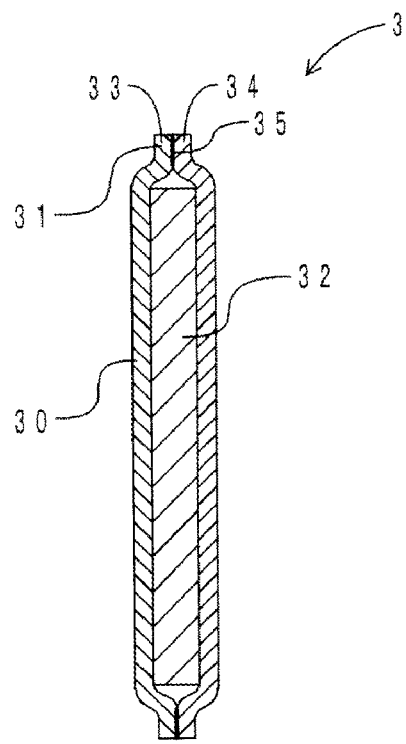
FIG. 4 is a cross-sectional view taken along a IV-IV line of FIG. 3.

For example, an embodiment in which the first base material and the second base material are fused is referred to as a third embodiment, and FIG. 3 shows a front view of a heat insulating material of the third embodiment. FIG. 4 shows a cross-sectional view taken along a IV-IV line of FIG. 3. In FIG. 3, for convenience of description, a heat insulating layer 32 is shown by a transparent dotted line. As shown in FIG. 3 and FIG. 4, a heat insulating material 3 has the heat insulating layer 32, a first base material 33, and a second base material 34. The configurations of the heat insulating layer 32, the first base material 33, and the second base material 34 are the same as those of the second embodiment. That is, the heat insulating layer 32 is interposed between the first base material 33 and the second base material 34 which are made of the glass cloth. The heat insulating material 3 has a main body part 30 and a peripheral edge part 31. The main body part 30 is a portion where the heat insulating layer 32, the first base material 33, and the second base material 34 overlap. The peripheral edge part 31 is arranged around the heat insulating layer 32 and is a portion where the first base material 33 and the second base material 34 overlap. A fused part 35 formed by fusing the first base material 33 and the second base material 34 is arranged on the peripheral edge part 31.

Figure 5:
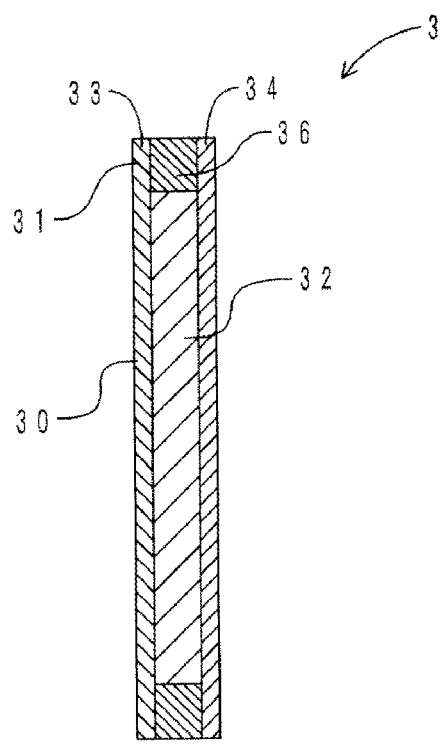
FIG. 5 is a cross-sectional view of a heat insulating material of a fourth embodiment.

An embodiment in which the fixing member instead of the fused part is arranged on the peripheral edge part is referred to as a fourth embodiment, and FIG. 5 shows a cross-sectional view of a heat insulating material of the fourth embodiment. FIG. 5 corresponds to the previous FIG. 4, and the same members as those in FIG. 4 are indicated by the same reference signs. As shown in FIG. 5, the heat insulating material 3 has the heat insulating layer 32, the first base material 33, and the second base material 34. The heat insulating layer 32 is interposed between the first base material 33 and the second base material 34 which are made of the glass cloth. The heat insulating material 3 has the main body part 30 and the peripheral edge part 31. A fixing member 36 is arranged on the peripheral edge part 31. The fixing member 36 is formed by an adhesive made of a thermoplastic elastomer. A thickness of the fixing member 36 is substantially the same as the thickness of the heat insulating layer 32. The first base material 33 and the second base material 34 are adhered to each other by the fixing member 36.

<Manufacturing Method of Heat Insulating Material>

The heat insulating material of the present disclosure can be manufactured by solidifying a composition having the porous structural body, the reinforcing fiber, and the nanoparticle of the metal oxide. For example, the heat insulating material can be manufactured by applying a paint for heat insulating layer to a surface of a base material and drying a coating film, and the paint for heat insulating layer is obtained in a manner that the porous structural body, the reinforcing fiber, and the nanoparticle of the metal oxide are dispersed in a liquid such as water or the like. For applying, a coating machine such as a bar coater, a die coater, a comma coater (registered trademark), a roll coater, or the like, a spray, and the like may be used. Alternatively, the base material may be dried after being immersed in the paint for heat insulating layer. In either the applying method or the immersing method, when the base material is made of a porous material such as a cloth or the like, a part of the paint for heat insulating layer may be impregnated inside the base material.

Hereinafter, as an example of the manufacturing method of the heat insulating material of the present disclosure, a manufacturing method of the heat insulating material of the above first embodiment including the heat insulating layer and the first base material is described. The manufacturing method of the heat insulating material of the first embodiment includes a paint preparation step and an applying step.

(1) Paint Preparation Step

In this step, the paint for heat insulating layer having the porous structural body, the reinforcing fiber, and a dispersion liquid in which the nanoparticles of the metal oxide are dispersed in a liquid is prepared. The paint for heat insulating layer may be prepared by adding the porous structural body, the reinforcing fiber, and components added as necessary to the dispersion liquid in which the nanoparticles of the metal oxide are dispersed in a liquid, and stirring the mixture. The liquid (dispersion medium) constituting the dispersion liquid is not particularly limited, but from the viewpoint of suppressing the infiltration to the pore of the porous structural body, the liquid desirably uses a hydrophilic liquid such as water (including pure water, tap water, and the like) or the like instead of a hydrophobic liquid. For example, when the nanoparticle of the metal oxide is the silica particle, an aqueous solution of sodium silicate, colloidal silica using water as a dispersion medium, and the like can be mentioned. When the nanoparticle of the metal oxide is a titania particle, the liquid may be an aqueous dispersion liquid of titania or the like. The stirring may be blade stirring, or may be performed by positively adding a shearing force or adding an ultrasonic wave. A rotation/revolution stirring device or a media type stirring device may be used.

(2) Applying Step

In this step, the prepared paint for heat insulating layer is applied to the first base material. As described above, the first base material desirably has a relatively low thermal conductivity, and has a high shape retention and flame retardancy even at a high temperature. For example, the cloth or the non-woven fabric such as the glass cloth or the like, which is manufactured from the inorganic fiber such as the glass fiber, the metal fiber, or the like, is suitable. In addition, in order to improve the adhesiveness between the first base material and the heat insulating layer, the surface of the first base material may be subjected to a pre-treatment such as a coupling treatment, and then may be applied with the paint for heat insulating layer.

As described above, in this step, the coating machine such as the bar coater or the like, the spray, or the like may be used to immerse the first base material into the paint for heat insulating layer. Then, by drying the coating film of the paint for heat insulating layer, the heat insulating material of the present disclosure including the heat insulating layer and the first base material laminated on this heat insulating layer is manufactured. The drying may be appropriately performed according to the dispersion medium, for example, when the dispersion medium is water, the coating film may be dried by being held at a temperature of about room temperature to 150° C. for a predetermined time.

EXAMPLES

Next, the present disclosure is described in more detail with reference to examples.

(1) Manufacture of Heat Insulating Material

First, various paints for heat insulating layer were prepared with blending amounts (the unit is parts by mass) shown in Table 1 and Table 2 below. Next, the prepared paint for heat insulating layer was applied to the surface of a first glass cloth with an aim of achieving a coating film having a thickness of 2 mm. Then, a second glass cloth was overlapped on the coating film to form a laminated body, and the laminated body was placed in a hot air oven to be held at 80° C. for one hour and then heated to 100° C. to be dried until there was no mass loss. In this way, a sample of a sheet-shaped heat insulating material including [the first glass cloth/the heat insulating layer/the second glass cloth] was manufactured. The first glass cloth is included in the concept of the first base material of the present disclosure, and the second glass cloth is included in the concept of the second base material of the present disclosure. Hereinafter, the preparing method for the paint for heat insulating layer in each sample is described in detail.

Examples 1 to 15, 17

Carboxyl methyl cellulose (CMC; carboxyl methyl cellulose sodium salt manufactured by Sigma-Aldrich, molecular weight 380,000) serving as a thickener was added to the colloidal silica (an aqueous dispersion liquid of the silica particles; "LUDOX (registered trademark) LS" manufactured by Sigma-Aldrich), and was stirred. Subsequently, a pulverized product of the silica aerogel was added and stirred, and then the glass fiber was further added and stirred to prepare the paint for heat insulating layer. The pulverized product of the silica aerogel is a spheroidized product obtained by pulverizing a silica aerogel ("P200" manufactured by Cabot Corporation) having a hydrophobic portion on the surface and inside using a household mixer, and the average particle diameter of the pulverized product is 100 μm. Five types (A to E) having different aspect ratios (length/diameter) were selected and used from "chopped strand" manufactured by Nippon Electric Glass Co., Ltd. as the glass fiber.

Example 16

The paint for heat insulating layer was prepared in the same manner as in Example 2 except that a silica aerogel that is not pulverized ("P200" manufactured by Cabot Corporation) was used instead of the pulverized product of the silica aerogel. The paints for heat insulating layer of Examples 1 to 17 are included in the concept of the paint for heat insulating layer of the present disclosure.

Comparison Example 1

A conventional organic binder instead of an inorganic binder was used as the binder to prepare the paint for heat insulating layer without adding the glass fiber. That is, after urethane resin emulsion ("permarin (registered trademark) UA-368" manufactured by Sanyo Chemical Industries, Ltd., solid content 50% by mass) used as the binder and the carboxyl methyl cellulose (same as above) used as the thickener were added to water and stirred, the pulverized product of the silica aerogel was added and stirred to prepare a paint for heat insulating layer of Comparison example 1.

Comparison Example 2

A paint for heat insulating layer of Comparison example 2 was prepared in the same manner as in Examples 1 to 5 except that the silica aerogel was not added.

Comparison Example 3

A paint for heat insulating layer of Comparison example 3 was prepared in the same manner as in Example 2, Examples 6 to 15, and Example 17 except that the glass fiber was not added.

Comparison Example 4

A paint for heat insulating layer of Comparison example 4 was prepared in the same manner as in Example 16 (using the silica aerogel that is not pulverized) except that the glass fiber was not added.

TABLE 1

| Component of heat insulating layer [part by mass] | | Example 1 | Example 2 | Example 3 | Example 4 | Example 5 | Comparison example 1 | Comparison example 2 | Comparison example 3 | Comparison example 4 |
|---|---|---|---|---|---|---|---|---|---|---|
| Inorganic binder (nanoparticle of metal oxide) | Silica particle | 81.3 | 81.3 | 81.3 | 81.3 | 81.3 | — | 81.3 | 81.3 | 81.3 |
| Organic binder | Urethane resin | — | — | — | — | — | 81.3 | — | — | — |
| Thickener | CMC | 18.7 | 18.7 | 18.7 | 18.7 | 18.7 | 18.7 | 18.7 | 18.7 | 18.7 |
| Porous structural body | Silica aerogel (pulverized product) | 280 | 230 | 150 | 50 | 25 | 230 | — | 230 | — |
| | Silica aerogel (unprocessed product) | — | — | — | — | — | — | — | — | 230 |
| Reinforcing fiber | Glass fiber A | 26 | 26 | 26 | 26 | 26 | — | 26 | — | — |
| | Glass fiber B | — | — | — | — | — | — | — | — | — |
| | Glass fiber C | — | — | — | — | — | — | — | — | — |
| | Glass fiber D | — | — | — | — | — | — | — | — | — |
| | Glass fiber E | — | — | — | — | — | — | — | — | — |
| Length of glass fiber [mm] | | 3 | 3 | 3 | 3 | 3 | — | 3 | — | — |
| Diameter of glass fiber [μm] | | 6.5 | 6.5 | 6.5 | 6.5 | 6.5 | — | 6.5 | — | — |
| Aspect ratio of glass fiber (length/diameter) | | 462 | 462 | 462 | 462 | 462 | — | 462 | — | — |
| Mass loss rate of heat insulating layer [%] | | 10 | 10 | 10 | 10 | 10 | 16 | 10 | 10 | 10 |
| Film forming property | Evaluation | ○ | ○ | ○ | ○ | ○ | ○ | ○ | x | x |
| | Whether there is crack | No | No | No | No | No | No | No | Yes | Yes |
| Heat insulating property | Evaluation | ○ | ○ | ○ | ○ | ○ | ○ | x | ○ | ○ |
| | Thermal conductivity [W/m·K] | 0.025 | 0.026 | 0.026 | 0.029 | 0.033 | 0.025 | 0.049 | 0.025 | 0.025 |
| Compression resistance (thermal conductivity) | Evaluation | ○ | ○ | ○ | ○ | ○ | x | x | ○ | ○ |
| | Thermal conductivity after compression test [W/m·K] | 0.031 | 0.033 | 0.033 | 0.039 | 0.042 | — | 0.051 | 0.032 | 0.035 |

TABLE 1-continued

| Component of heat insulating layer [part by mass] | | Example 1 | Example 2 | Example 3 | Example 4 | Example 5 | Comparison example 1 | Comparison example 2 | Comparison example 3 | Comparison example 4 |
|---|---|---|---|---|---|---|---|---|---|---|
| Compression resistance (thickness change) | Evaluation | ○ | ○ | ○ | ○ | ○ | x | ○ | x | ○ |
| | Thickness change rate after compression test [%] | 59 | 57 | 58 | 52 | 38 | 90 | 12 | 70 | 60 |
| Heat resistance (shape retention of heat insulating layer at high temperature) | Evaluation | ○ | ○ | ○ | ○ | ○ | x | ○ | x | x |
| | Whether there is crack | No | No | No | No | No | Yes | No | Yes | Yes |

TABLE 2

| Component of heat insulating layer [part by mass] | | Example 6 | Example 7 | Example 8 | Example 9 | Example 10 | Example 11 | Example 12 | Example 13 | Example 14 |
|---|---|---|---|---|---|---|---|---|---|---|
| Inorganic binder (nanoparticle of metal oxide) | Silica particle | 81.3 | 81.3 | 81.3 | 81.3 | 81.3 | 81.3 | 81.3 | 81.3 | 81.3 |
| Organic binder | Urethane resin | — | — | — | — | — | — | — | — | — |
| Thickener | CMC | 18.7 | 18.7 | 18.7 | 18.7 | 18.7 | 18.7 | 18.7 | 18.7 | 18.7 |
| Porous structural body | Silica aerogel (pulverized product) | 230 | 230 | 230 | 230 | 230 | 230 | 230 | 230 | 230 |
| | Silica aerogel (unprocessed product) | — | — | — | — | — | — | — | — | — |
| Reinforcing fiber | Glass fiber A | 5 | 13 | 39 | 78 | 104 | 130 | — | — | — |
| | Glass fiber B | — | — | — | — | — | — | 26 | — | — |
| | Glass fiber C | — | — | — | — | — | — | — | 26 | — |
| | Glass fiber D | — | — | — | — | — | — | — | — | 26 |
| | Glass fiber E | — | — | — | — | — | — | — | — | — |
| Length of glass fiber [mm] | | 3 | 3 | 3 | 3 | 3 | 3 | 3 | 13 | 25 |
| Diameter of glass fiber [μm] | | 6.5 | 6.5 | 6.5 | 6.5 | 6.5 | 6.5 | 10 | 13 | 13 |
| Aspect ratio of glass fiber (length/diameter) | | 462 | 462 | 462 | 462 | 462 | 462 | 300 | 1000 | 1923 |
| Mass loss rate of heat insulating layer [%] | | 10 | 10 | 10 | 10 | 10 | 10 | 10 | 10 | 10 |
| Film forming property | Evaluation | ○ | ○ | ○ | ○ | ○ | ○ | ○ | ○ | ○ |
| | Whether there is crack | No | No | No | No | No | No | No | No | No |
| Heat insulating property | Evaluation | ○ | ○ | ○ | ○ | ○ | ○ | ○ | ○ | ○ |
| | Thermal conductivity [W/m · K] | 0.026 | 0.026 | 0.025 | 0.025 | 0.026 | 0.026 | 0.025 | 0.026 | 0.024 |
| Compression resistance (thermal conductivity) | Evaluation | ○ | ○ | ○ | ○ | ○ | ○ | ○ | ○ | ○ |
| | Thermal conductivity after compression test [W/m · K] | 0.031 | 0.030 | 0.030 | 0.031 | 0.031 | 0.030 | 0.031 | 0.032 | 0.031 |
| Compression resistance (thickness change) | Evaluation | ○ | ○ | ○ | ○ | ○ | ○ | ○ | ○ | ○ |
| | Thickness change rate after compression test [%] | 65 | 62 | 61 | 59 | 53 | 57 | 52 | 62 | 59 |

TABLE 2-continued

| | | | | | | | | | | |
|---|---|---|---|---|---|---|---|---|---|---|
| Heat resistance (shape retention of heat insulating layer at high temperature) | Evaluation Whether there is crack | ○ No | ○ No | ○ No | ○ No | ○ No | ○ No | ○ No | ○ No | ○ No |

| Component of heat insulating layer [part by mass] | | Example 15 | Example 16 | Example 17 |
|---|---|---|---|---|
| Inorganic binder (nanoparticle of metal oxide) | Silica particle | 81.3 | 81.3 | 81.3 |
| Organic binder | Urethane resin | — | — | — |
| Thickener | CMC | 18.7 | 18.7 | 18.7 |
| Porous structural body | Silica aerogel (pulverized product) | 230 | — | 230 |
| | Silica aerogel (unprocessed product) | — | 230 | — |
| Reinforcing fiber | Glass fiber A | — | 26 | 200 |
| | Glass fiber B | — | — | — |
| | Glass fiber C | — | — | — |
| | Glass fiber D | — | — | — |
| | Glass fiber E | 26 | — | — |
| Length of glass fiber [mm] | | 13 | 3 | 3 |
| Diameter of glass fiber [μm] | | 18 | 6.5 | 6.5 |
| Aspect ratio of glass fiber (length/diameter) | | 722 | 462 | 462 |
| Mass loss rate of heat insulating layer [%] | | 10 | 10 | 10 |
| Film forming property | Evaluation Whether there is crack | ○ No | ○ No | ○ No |
| Heat insulating property | Evaluation Thermal conductivity [W/m · K] | ○ 0.025 | ○ 0.025 | ○[X.1] 0.027 |
| Compression resistance (thermal conductivity) | Evaluation Thermal conductivity after compression test [W/m · K] | ○ 0.032 | ○ 0.032 | ○ 0.032 |
| Compression resistance (thickness change) | Evaluation Thickness change rate after compression test [%] | ○ 61 | ○ 60 | ○ 60 |
| Heat resistance (shape retention of heat insulating layer at high temperature) | Evaluation Whether there is crack | ○ No | ○ No | ○ No |

[X.1] Workability has decreased.

(2) Mass Loss Rate of Heat Insulating Layer

The sample of the heat insulating material of this example includes two glass cloths in addition to the heat insulating layer. Therefore, only the heat insulating layer was cut out from the sample of the heat insulating material by a mass of 3 to 5 mg, and the cut heat insulating layer of 3 to 5 mg was used as a sample for measuring the mass loss rate to calculate the mass loss rate of the heat insulating layer as follows. First, the sample for measuring the mass loss rate was placed in a thermogravimetric analysis device ("Q500" manufactured by TA Instruments), and heated from the room temperature to 500° C. at a heating rate of 80° C./min in an air atmosphere. When the temperature reached 500° C., the sample was held with no change for 30 minutes, and then the sample for measuring the mass loss rate was taken out to measure the mass. Then, the mass loss rate of the heat insulating layer was calculated by the above-described formula (I), where the initial mass of the sample for measuring the mass loss rate was regarded as $W_0$, and the mass of the sample after being held at 500° C. for 30 minutes was regarded as $W_1$. The mass loss rates of the heat insulating layer obtained in this way are summarized in Table 1 and Table 2 described above.

(3) Evaluation Method for Heat Insulating Material

The film forming property, the heat insulating property, the compression resistance, and the heat resistance of the manufactured sample of the heat insulating material were evaluated by the following methods.

[Film Forming Property]

The appearance of the sample of the heat insulating material was visually observed to check whether there is a crack. In the above Table 1 and Table 2, as an evaluation result, a case where no crack was confirmed is indicated by a "○" mark, and a case where a crack was confirmed is indicated by a "x" mark.

[Heat Insulating Property]

The thermal conductivity of the sample of the heat insulating material was measured using a thermal conductivity measuring instrument "Quick Lambda" manufactured by EKO Instruments. The thermal conductivity measuring instrument relatively calculates the thermal conductivity by a testing curve calibrated using a substance having a known thermal conductivity as a standard sample for testing. Thus, first, as the standard sample, three types of samples of the heat insulating material having different blending amounts of the silica aerogel were manufactured by the same method as the manufacturing method for the sample of Comparison example 1. The blending amounts of the silica aerogel in each sample were set to 153 parts by mass, 230 parts by mass, and 307 parts by mass. Next, the thermal conductivity of each sample (the standard sample) was measured using a heat flux meter "HC-074" manufactured by EKO Instruments, which conformed to a heat flow meter method of JIS A1412-2 (1999), and the value of the thermal conductivity was used to calibrate the thermal conductivity measuring instrument. In the above Table 1 and Table 2, as an evaluation result, a case where the thermal conductivity is 0.045 W/m·K or less is indicated by a "○" mark, and a case where the thermal conductivity is larger than 0.045 W/m·K is indicated by a "x" mark.

[Compression Resistance]

A disk-shaped sample having a diameter of 60 mm was cut out from the sample of the heat insulating material and used as a sample for a compression test. The sample for the compression test was placed in a compression test machine and compressed at a speed of 3 mm/min until a compression pressure reached 15 MPa. When the compression pressure reached 15 MPa, the sample for the compression test was held for one minute, and then returned to a state where the compression pressure is 0 MPa (no load) at the same speed.

The thermal conductivity of the sample for the compression test after compression was measured using the above-described thermal conductivity measuring instrument. In the above Table 1 and Table 2, as an evaluation result, a case where the thermal conductivity is 0.045 W/m·K or less is indicated by a "○" mark, and a case where the thermal conductivity is larger than 0.045 W/m·K is indicated by a "x" mark.

Thicknesses of the sample for the compression test before and after the compression were measured, and a thickness change rate was calculated by the following formula (II). In the above Table 1 and Table 2, as an evaluation result, a case where the thickness change rate is smaller than 70% is indicated by a "○" mark, and a case where the thickness change rate is 70% or more is indicated by a "x" mark.

$$\text{Thickness change rate}(\%) = (T_0 - T_1)/T_0 \times 100 \quad \text{(II)}$$

[$T_0$: Sample Thickness Before Compression; $T_1$: Sample Thickness after Compression]

[Heat Resistance]

The paint for heat insulating layer prepared at the time of manufacturing the sample of the heat insulating material is poured into a rectangular parallelepiped mold having a volume of 1 cm³, placed in a hot air oven and held at 80° C. for one hour, and then heated to 100° C. to be dried until there was no mass loss and demolded. The obtained molded body was further held at 600° C. for 10 minutes, and then whether there is a crack is checked. In the above Table 1 and Table 2, as an evaluation result, a case where no crack was confirmed is indicated by a "○" mark, and a case where a crack was confirmed is indicated by a "x" mark.

(4) Evaluation Result of Heat Insulating Material

The evaluation results of the heat insulating material are summarized in the above Table 1 and Table 2. First, as shown in Table 1, in each of the samples of Examples 1 to 5 using the inorganic binder (the silica particle) and having the reinforcing fiber (the glass fiber), the mass loss rate of the heat insulating layer is 10% or less, and the film forming property, the heat insulating property, the compression resistance, and heat resistance are good. That is, in the samples of Examples 1 to 5, a thin film-like heat insulating layer without cracks was formed, the thermal conductivity of the heat insulating layer is relatively small, the heat insulating layer is less likely to be crushed and can maintain the heat insulating property even if compressed. In addition, the heat insulating layer can maintain the shape without cracking even when held at a high temperature. Besides, as the blending amount of the silica aerogel increases, the thermal conductivity tends to decrease (the heat insulating property tends to improve), but the thickness change caused by compression tends to increase.

In contrast, in the sample of Comparison example 1 using the organic binder, the mass loss rate of the heat insulating layer is larger than 10%, and the film forming property and the heat insulating property are good, but the heat insulating material was crushed by compression, resulting in that the thermal conductivity cannot be measured and the compression resistance is inferior. In addition, if the heat insulating material was held at a high temperature, the crack occurred, also resulting in inferior heat resistance. In addition, in the sample of Comparison example 2 having no silica aerogel, the desired heat insulating property cannot be obtained. In the samples of Comparison examples 3 and 4 having no reinforcing fiber, in addition to the deterioration of the film forming property, the shape cannot be maintained at a high temperature.

Next, as shown in Table 2, also in the samples of Examples 6 to 17, the mass loss rate of the heat insulating layer is 10% or less, and the film forming property, the heat insulating property, the compression resistance, and heat resistance are good. Comparing the samples of Examples 6 to 11 in which the blending amount of the reinforcing fiber was changed, it was confirmed that when the blending amount of the reinforcing fiber is increased, the thickness change caused by compression tends to decrease, and the compression resistance is improved. Moreover, in the sample of Example 17 in which the blending amount of the reinforcing fiber is the largest, the viscosity of the paint for heat insulating layer is increased, and the workability is decreased. In the samples of Examples 12 to 15, the types (aspect ratios) of the reinforcing fiber are different, but all the reinforcing fibers have good film forming property, heat insulating property, compression resistance, and heat resistance. The sample of Example 16 differs from the sample of Example 2 in whether there is pulverization processing of the silica aerogel. When the pulverized product is used as in Example 2, the viscosity of the paint for heat insulating layer is low. Thereby, a mixing and dispersing time during the preparation of the paint can be shortened, and the improvement in workability can be expected. In addition, it can also be confirmed that the silica aerogel has an effect of suppressing powder falling and the shape retention is improved.

INDUSTRIAL APPLICABILITY

The heat insulating material of the present disclosure is suitable for a heat insulating interior material for automobiles, a heat insulating material for houses, a heat insulating material for home appliances, a heat insulating material for electronic components, a heat insulating material for heat insulating and cold insulating containers, and the like.

What is claimed is:

1. A heat insulating material, comprising:
a heat insulating layer, and
a first base material laminated on the heat insulating layer, wherein the heat insulating layer comprising:
a porous structural body, wherein the porous structural body has a hydrophobic portion on at least one of exterior and interior surfaces of the porous structural body, and the porous structural body is a silica aerogel body in which a plurality of the silica aerogel particles are connected to each other to form a skeleton, and pores formed between the silica aerogel particles,
glass fibers, wherein the glass fibers are physically intertwined around the porous structural body,
a carboxyl methyl cellulose thickener, and
a silica particle binder, wherein the silica aerogel particles and the glass fibers are bonded via the silica particle binder,
wherein the heat insulating layer has a mass loss rate of 10% or less in thermogravimetric analysis held at 500° C. for 30 minutes,
the heat insulating layer is impregnated with a mesh near a contact surface between the heat insulating layer and the first base material, and
wherein the first base material is a cloth or a non-woven fabric manufactured from a glass fiber or a metal fiber.

2. The heat insulating material according to claim 1, wherein the porous structural body is pulverized.

3. The heat insulating material according to claim 1, wherein the porous structural body has a chamfered shape.

4. The heat insulating material according to claim 1, wherein a content of the porous structural body in the heat insulating layer is 50 parts by mass or more and 280 parts by mass or less with respect to 100 parts by mass of components excluding the porous structural body and the glass fibers.

5. The heat insulating material according to claim 1, wherein a content of the glass fibers in the heat insulating layer is 5 parts by mass or more and 200 parts by mass or less with respect to 100 parts by mass of components excluding the porous structural body and the glass fibers.

6. The heat insulating material according to claim 1, wherein a diameter of the glass fibers is 6.5 μm or more and 18 μm or less, and a length of the glass fibers is 3 mm or more and 25 mm or less.

7. The heat insulating material according to claim 1, comprising the heat insulating layer, the first base material, and a second base material, wherein the heat insulating layer is interposed between the first base material and the second base material.

8. The heat insulating material according to claim 7, wherein the second base material is a glass cloth.

9. The heat insulating material according to claim 7, comprising a main body part, and a peripheral edge part, wherein a peripheral edge of the first base material and a peripheral edge of the second base material respectively extends beyond a peripheral edge of the heat insulating layer such that the heat insulating layer is fully enclosed by the first and second based materials,
the main body part is a part where the first base material, the second base material, and the heat insulating layer are laminated to each other, and
the peripheral edge part is a part where the first base material and the second base material overlap around the heat insulating layer.

10. The heat insulating material according to claim 9, wherein the first base material and the second base material are fused at the peripheral edge part.

11. The heat insulating material according to claim 9, wherein the first base material and the second base material are fixed by a fixing member, and the fixing member is arranged on the peripheral edge part.

12. The heat insulating material according to claim 11, wherein the fixing member has elasticity.

* * * * *